(12) United States Patent
Maddox et al.

(10) Patent No.: US 11,262,570 B2
(45) Date of Patent: Mar. 1, 2022

(54) MIRROR IMAGE MICROSCOPY FOR INCREASED COLLECTION

(71) Applicant: The University of North Carolina at Chapel Hill, Chapel Hill, NC (US)

(72) Inventors: Paul Samuel Maddox, Chapel Hill, NC (US); Tanner Christian Fadero, Chapel Hill, NC (US)

(73) Assignee: THE UNIVERSITY OF NORTH CAROLINA AT CHAPEL HILL, Chapel Hill, NC (US)

( * ) Notice: Subject to any disclaimer, the term of this patent is extended or adjusted under 35 U.S.C. 154(b) by 0 days.

(21) Appl. No.: 16/980,231

(22) PCT Filed: Mar. 12, 2019

(86) PCT No.: PCT/US2019/021842
§ 371 (c)(1),
(2) Date: Sep. 11, 2020

(87) PCT Pub. No.: WO2019/178093
PCT Pub. Date: Sep. 19, 2019

(65) Prior Publication Data
US 2021/0033841 A1 Feb. 4, 2021

Related U.S. Application Data

(60) Provisional application No. 62/641,533, filed on Mar. 12, 2018.

(51) Int. Cl.
*G02B 21/36* (2006.01)
*G01N 21/64* (2006.01)
(Continued)

(52) U.S. Cl.
CPC ....... *G02B 21/365* (2013.01); *G01N 21/6458* (2013.01); *G02B 21/08* (2013.01); *G02B 21/16* (2013.01)

(58) Field of Classification Search
CPC .... G01N 21/6458; G02B 17/086; G02B 1/06; G02B 21/0076; G02B 21/04; G02B 21/08; G02B 21/16
See application file for complete search history.

(56) References Cited

U.S. PATENT DOCUMENTS 4,199,686 A * 4/1980 Brunsting ............ G01N 21/645
250/459.1
4,871,249 A * 10/1989 Watson ..................... G02B 5/10
356/73

(Continued)

FOREIGN PATENT DOCUMENTS

DE  10 2014 118 025 A1  6/2016
JP  2002-506203 A  2/2002

(Continued)

OTHER PUBLICATIONS

Office Action for Canadian Application Serial No. 3,035,788 (dated Apr. 8, 2020).

(Continued)

*Primary Examiner* — Peter D Le
(74) *Attorney, Agent, or Firm* — Jenkins, Wilson, Taylor & Hunt, P.A.

(57) ABSTRACT

Methods for imaging a sample using fluorescence microscopy, systems for imaging a sample using fluorescence microscopy, and illumination systems for fluorescence microscopes. In some examples, a method includes positioning a dual convex paraboloidal mirror enclosure around the sample. The dual convex paraboloidal mirror enclosure includes an upper paraboloidal mirror and a lower paraboloidal mirror oriented antiparallel to each other. An aperture is defined in the lower paraboloidal mirror, a hemispherical dome is mounted in the aperture, and the sample is surrounded by the hemispherical dome. The method includes directing excitation light onto the sample to form a primary (Continued)

image at an upper vertex of the upper paraboloidal mirror and a secondary image at a lower vertex of the lower paraboloidal minor. The method includes imaging the sample through a detection objective of a microscope.

20 Claims, 10 Drawing Sheets

(51) Int. Cl.
*G02B 21/08* (2006.01)
*G02B 21/16* (2006.01)

(56) References Cited

U.S. PATENT DOCUMENTS

| | | | |
|---|---|---|---|
| 5,293,269 A | 3/1994 | Burkhart et al. | |
| 5,644,400 A | 7/1997 | Mundt | |
| 5,650,877 A * | 7/1997 | Phillips, Jr. | G02B 17/0808 359/621 |
| 6,088,097 A * | 7/2000 | Uhl | G02B 21/0036 250/458.1 |
| 6,819,411 B1 * | 11/2004 | Sharpe | G01N 21/49 356/72 |
| 7,166,838 B1 * | 1/2007 | Janik | G01N 23/04 250/310 |
| 11,099,370 B2 | 8/2021 | Maddox et al. | |
| 2001/0028497 A1 * | 10/2001 | Uhl | G02B 21/088 359/387 |
| 2001/0040717 A1 * | 11/2001 | Minoura | G02F 1/1334 359/263 |
| 2003/0137725 A1 | 7/2003 | Mueller et al. | |
| 2005/0006585 A1 * | 1/2005 | Graham | G01B 11/0625 250/339.01 |
| 2005/0111084 A1 * | 5/2005 | Mandella | G02B 17/086 359/364 |
| 2005/0134841 A1 * | 6/2005 | Vacz-Lravani | G01N 21/9501 356/237.4 |
| 2005/0174568 A1 | 8/2005 | Vaez-Iravani et al. | |
| 2006/0146343 A1 * | 7/2006 | Wadman | G01N 21/474 356/600 |
| 2006/0239404 A1 | 10/2006 | Udpa et al. | |
| 2006/0290936 A1 * | 12/2006 | Imura | G01N 21/57 356/446 |
| 2007/0109633 A1 | 5/2007 | Stelzer et al. | |
| 2007/0153368 A1 | 7/2007 | Vucinic et al. | |
| 2009/0195866 A1 * | 8/2009 | Kawaski | G01N 21/6458 359/385 |
| 2009/0296087 A1 | 12/2009 | Dyshkant et al. | |
| 2010/0188957 A1 * | 7/2010 | Knittel | G11B 7/24 369/100 |
| 2010/0309566 A1 | 12/2010 | DeWitt et al. | |
| 2011/0300490 A1 * | 12/2011 | Rachet | G03F 7/70191 430/322 |
| 2011/0310393 A1 * | 12/2011 | Smirnov | G01N 21/4738 356/446 |
| 2012/0043476 A1 * | 2/2012 | Salmelainen | G01N 21/645 250/458.1 |
| 2015/0098126 A1 | 4/2015 | Keller et al. | |
| 2015/0286042 A1 | 10/2015 | Hilbert et al. | |
| 2016/0048014 A1 * | 2/2016 | Kn | G02B 21/0076 348/80 |
| 2016/0123869 A1 * | 5/2016 | Messerschmidt | G01N 21/65 356/39 |
| 2016/0139394 A1 | 5/2016 | Taniguchi et al. | |
| 2018/0052186 A1 * | 2/2018 | Su | G01Q 60/32 |
| 2019/0196167 A1 | 6/2019 | Maddox et al. | |
| 2019/0219807 A1 * | 7/2019 | Kobayashi | G02B 17/086 |
| 2020/0088982 A1 * | 3/2020 | Jin | G02B 21/0024 |
| 2021/0011269 A1 | 1/2021 | Maddox et al. | |

FOREIGN PATENT DOCUMENTS

| | | |
|---|---|---|
| JP | 2015-537236 A | 12/2015 |
| WO | WO 97/12226 | 4/1997 |
| WO | WO 01/61324 A1 | 8/2001 |
| WO | WO 2015/155027 A1 | 10/2015 |
| WO | WO 2018/049306 A1 | 3/2018 |
| WO | WO 2019/178090 A1 | 9/2019 |

OTHER PUBLICATIONS

Extended European Search Report for European Application Serial No. 17849706.1 (dated Apr. 7, 2020).
Notification of Transmittal of the International Search Report and the Written Opinion of the International Searching Authority, or the Declaration for International Application Serial No. PCT/US2019/021839 (dated Jun. 26, 2019).
Communication of European publication number and information on the application of Article 67(3) for European Application Serial No. 17849706.1 (dated May 29, 2019).
Notification of Transmittal of the International Search Report and the Written Opinion of the International Searching Authority, or the Declaration for International Application No. PCT/US2019/021842 (dated Mar. 12, 2019).
Fadero et al., "LITE microscopy: Tilted light-sheet excitation of model organisms offers high resolution and low photobleaching," Journal of Cell Biology, pp. 1-14 (Feb. 28, 2018).
International Search Report and Written Opinion of the International Searching Authority for International Application Serial No. PCT/US2017/050914 (dated Dec. 28, 2017).
Golub et al., "Toward the optical "magic carpet": reducing the divergence of a light sheet below the diffraction limit," Optics Letters, vol. 40, No. 21, pp. 5121-5124 (Nov. 1, 2015).
Chen et al., "Lattice light-sheet microscopy: Imaging molecules to embryos at high spatiotemporal resolution," Science, vol. 346, Issue 6208, 13 pages (Oct. 24, 2014).
Huisken et al., "Even fluorescence excitation by multidirectional selective plane illumination microscopy (mSPIM)," Optics Letters, vol. 32, No. 17, pp. 2608-2610 (Sep. 1, 2007).
Hell et al., "Confocal microscopy with an increased detection aperture: type-B 4Pi confocal microscopy," Optics Letters, vol. 19, No. 3, pp. 1-4 (Feb. 1, 1994).
Notice of Allowance and Fee(s) Due for U.S. Appl. No. 16/328,710 (dated Apr. 19, 2021).
Office Action for Canadian Patent Application Serial No. 3,035,788 (dated Feb. 2, 2021).
First Office Action for Japanese Patent Application Serial No. 2019-513848 (dated Jan. 12, 2021).
Non-Final Office Action for U.S. Appl. No. 16/328,710 (dated Dec. 15, 2020).
Golub, I., et al., "Toward the optical "magic carpet": reducing the divergence of a light sheet below the diffraction limit," Optics Letters, vol. 40., No. 21, pp. 5121-5124 (Nov. 1, 2015).
Notice of Allowance and Fee(s) Due for U.S. Appl. No. 16/980,225 (dated Sep. 10, 2021).
Corrected Notice of Allowability for U.S. Appl. No. 16/328,710 (dated Jul. 27, 2021).
Decision for Rejection for Japanese Patent Application No. 2019-513848 (dated Jul. 6, 2021).
Drechsler et al., "Confocal microscopy with a high numerical aperture parabolic mirror," Optics Express, vol. 9, No. 12, pp. 1-8 (Dec. 3, 2001).

* cited by examiner

IMAGE IS FORMED ON TOP OF SAMPLE WHEN SAMPLE PLACED AT VERTEX
IMAGE IS INVERTED IN Z, BUT THE IMAGE OVERLAPS THE SAMPLE PERFECTLY AT THE VERTEX PLANE

MIRROR IMAGE MICROSCOPY FOR INCREASED COLLECTION

PRIORITY CLAIM

This application claims the benefit of U.S. Provisional Patent Application Ser. No. 62/641,533 filed Mar. 12, 2018, the disclosure of which is incorporated herein by reference in its entirety.

GOVERNMENT INTEREST

This invention was made with government support under Grant Number MCB-1652512 awarded by the National Science Foundation. The government has certain rights in the invention.

TECHNICAL FIELD

This specification relates generally to fluorescence microscopes and more particularly to mirror image microscopy for increase collection.

BACKGROUND

Live-cell fluorescence microscopy relies on exciting fluorescent molecules inside of biological samples, capturing photons emitted from the fluorophores, and refocusing the emitted photons to recreate a magnified image of the sample. FIG. 1 illustrates an example system 100 for fluorescence microscopy of a sample 102. System 100 includes a detection objective 104 of a microscope. Sample 102 is mounted in view of detection objective 104.

The amount of excitation light directed onto the sample exceeds the amount of emitted fluorescence light collected from the sample by several orders of magnitude. Thus, capturing the maximum number of photons is critical to fluorescence microscopy, as the number of photons collected is directly proportional to both image quality and image resolution.

Fluorescence microscopy has relied on Snell's Law of Refraction to bend emitted fluorescent photons, typically through curved glass lenses. Ultimately, refraction is not ideal for capturing and refocusing fluorescence, for two reasons: chromatic aberration and collection efficiency. Modern objective-type lens elements have been strongly corrected for chromatic aberration, but it is theoretically unavoidable with refraction. Additionally, lens objectives are theoretically only able to collect half of all photons emitted from a fluorescent point-source. Due to practical limitations from total internal reflection, collection efficiency has been limited to around 40% from a single objective.

This lack of detection efficiency presents a problem to cell biologists, since emitted photons are a limiting factor in image acquisition. FIG. 2 is a diagram illustrating lack of detection efficiency resulting from photos not being collected. Multiplexing objectives (such as 4Pi microscopy(1)) has increased the overall collection efficiency of an optical system, but the number of photons collected by a single lens objective remains unchanged. Additionally, multiplexing lens objectives complicated the detection pathway, since both objectives produce separate images of the same sample.

SUMMARY

This specification describes a system for theoretically doubling the collection efficiency of any existing fluorescence microscope without complicating the original detection pathway or introducing chromatic aberration. In some examples, a method includes positioning a dual convex paraboloidal mirror enclosure around the sample. The dual convex paraboloidal mirror enclosure includes an upper paraboloidal mirror and a lower paraboloidal mirror oriented antiparallel to each other. An aperture is defined in the lower paraboloidal mirror, a hemispherical dome is mounted in the aperture, and the sample is surrounded by the hemispherical dome. The method includes directing excitation light onto the sample to form a primary image at an upper vertex of the upper paraboloidal mirror and a secondary image at a lower vertex of the lower paraboloidal mirror. The method includes imaging the sample through a detection objective of a microscope.

DESCRIPTION

This specification describes methods for imaging a sample using fluorescence microscopy, systems for imaging a sample using fluorescence microscopy, and illumination systems for fluorescence microscopes. The systems can be referred to as MIMIC: Mirror Image Microscopy for Increased Collection.

Figure 3:
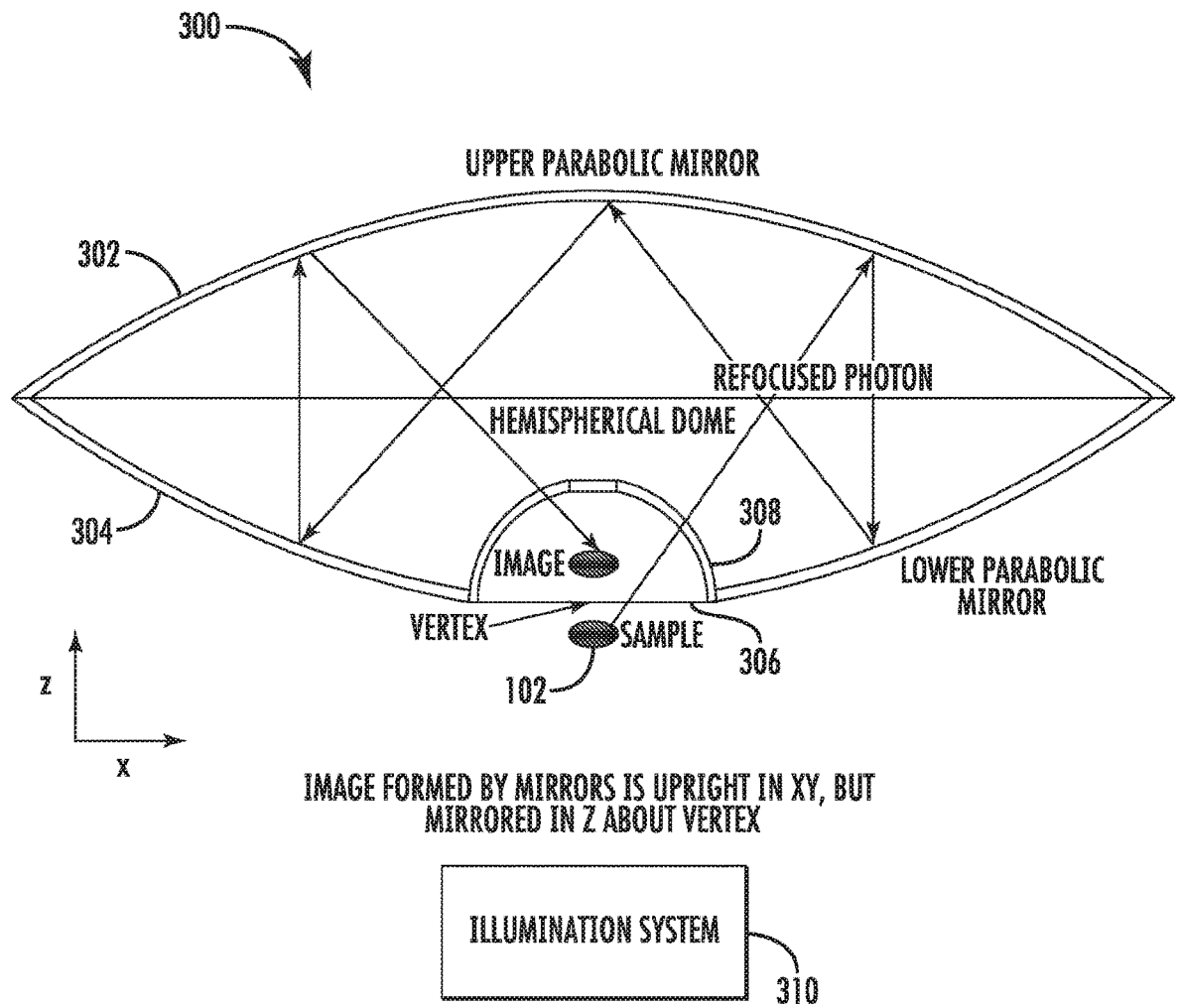
FIG. 3 is a diagram illustrating an example system for imaging a sample using fluorescence microscopy.

FIG. 3 is a diagram illustrating an example system for imaging a sample 102 using fluorescence microscopy. The system includes a dual convex paraboloidal mirror enclosure 300 positioned around sample 102. Dual convex paraboloidal mirror enclosure 300 includes an upper paraboloidal mirror 302 and a lower paraboloidal mirror 304 oriented antiparallel each other. An aperture 306 is defined in lower paraboloidal mirror 304, a hemispherical dome 308 is mounted in aperture 306, and sample 102 is surrounded by hemispherical dome 308.

Figure 1:
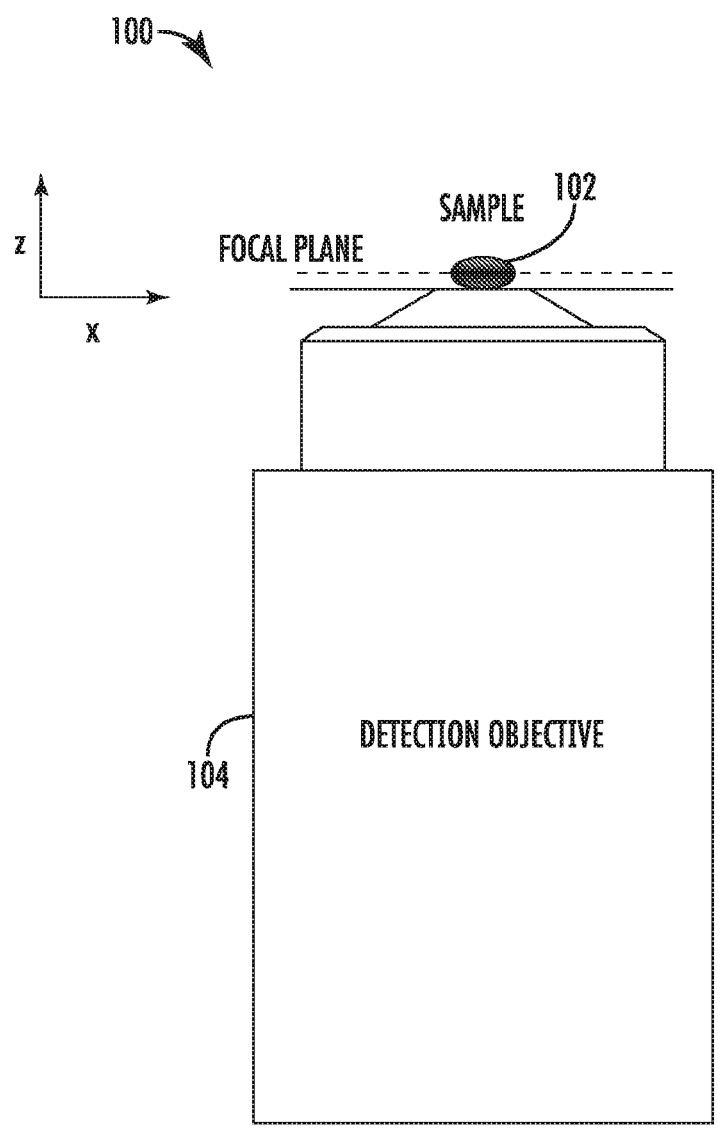
FIG. 1 illustrates an example system for fluorescence microscopy of a sample.
Figure 2:
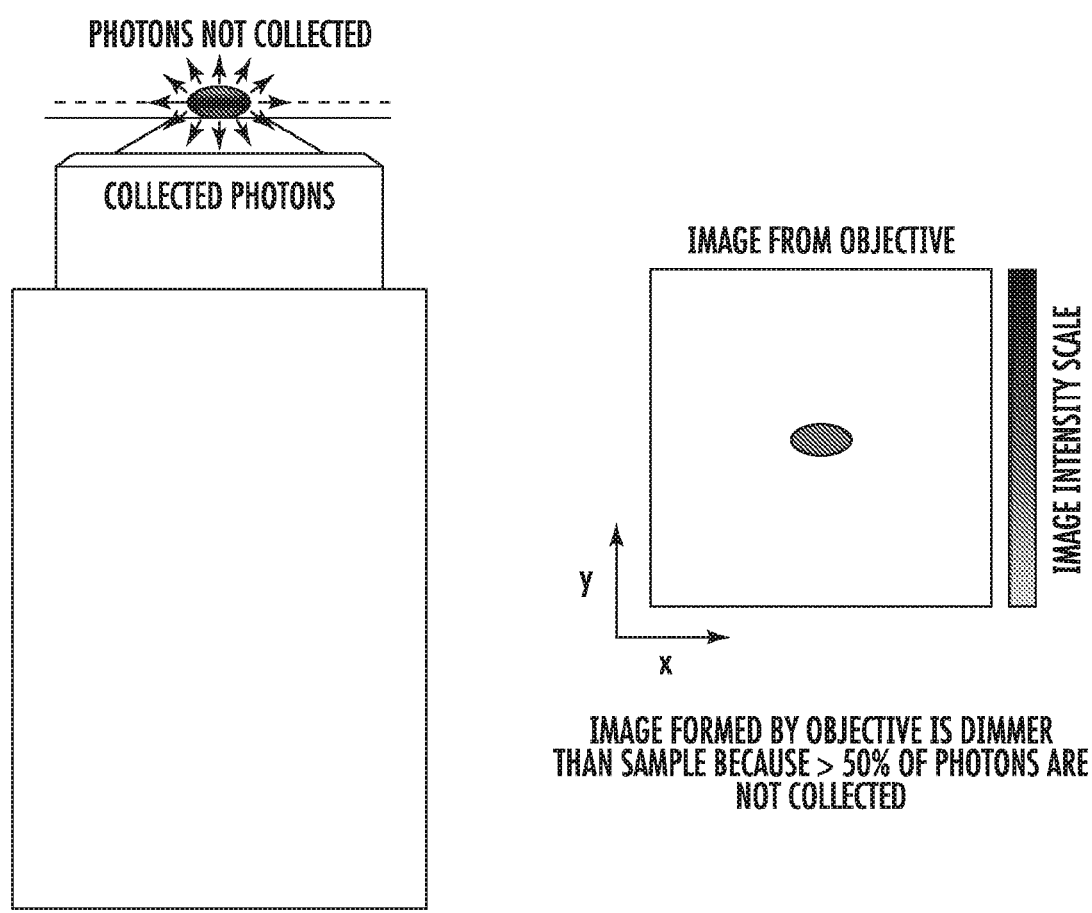
FIG. 2 is a diagram illustrating lack of detection efficiency resulting from photos not being collected.

The system also includes an illumination system 310 configured for directing excitation light onto sample 102 to form a primary image at an upper vertex of upper paraboloidal mirror 302 and a secondary image at a lower vertex of lower paraboloidal mirror 304. In some examples, illumination system 310 is configured for imaging the sample through a detection objective, e.g., detection object 104 of FIG. 1.

FIG. 3 shows the secondary optic responsible for increasing the collection efficiency. The optic is a dual convex paraboloid mirror enclosure, with the paraboloid mirrors oriented antiparallel to the other. Additionally, the focal lengths and the larger openings of both paraboloids are identical. The focal point of each paraboloid is positioned at the vertex of the other paraboloid. Accordingly, the height of each paraboloid should be half the focal length so that the paraboloids can be mounted on top of each other without physically overlapping.

The lower paraboloid has an aperture centered about its vertex, in which a hemispherical glass dome is mounted. The dome is clear and is centered around the vertex of the lower paraboloid. The dome can be formed from any appropriate material, e.g., glass or plastic or a polymer such as polydimethylsiloxane (PDMS). The dome is of a uniform thickness so that it provides a clear, unfocusing window from the vertex to the upper paraboloid. Finally, the hemispherical dome has an aperture at its top so that the dome can be filled with a liquid media suitable for the live sample.

The purpose of the aforementioned geometry is that the vertex plane of the lower paraboloid is optically conjugate to the vertex of the upper paraboloid. Accordingly, photons emitted from points near or at the lower vertex are collected and collimated by the upper paraboloid mirror. Next, the collimated photons are refocused by the lower paraboloid to form a primary image at the vertex of the upper paraboloid. Next, the photons are re-collimated by the lower paraboloid. Finally, the photons are re-focused to a secondary image at or near the lower vertex.

Figure 4:
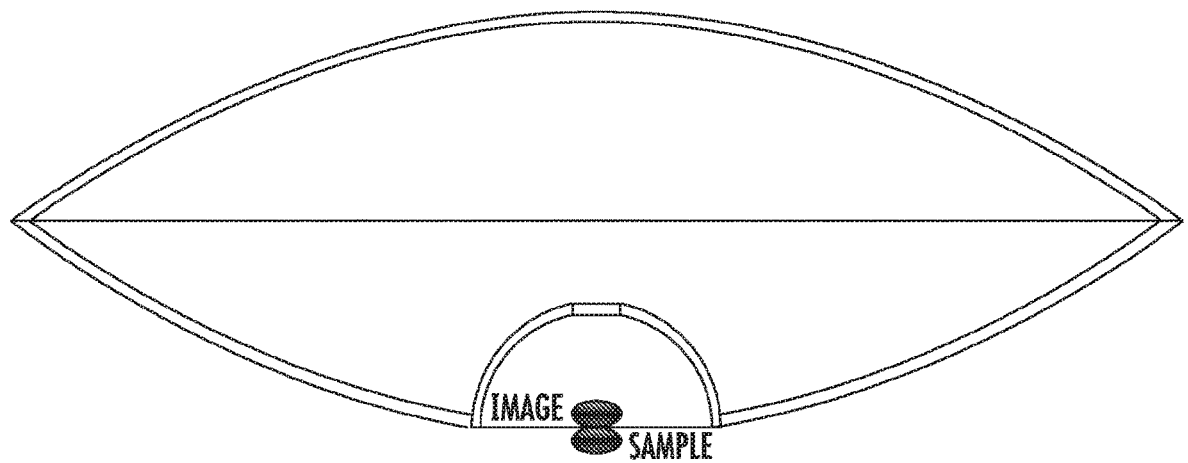
FIG. 4 is a diagram illustrating an image overlapping the sample at the vertex plane.
Figure 5:
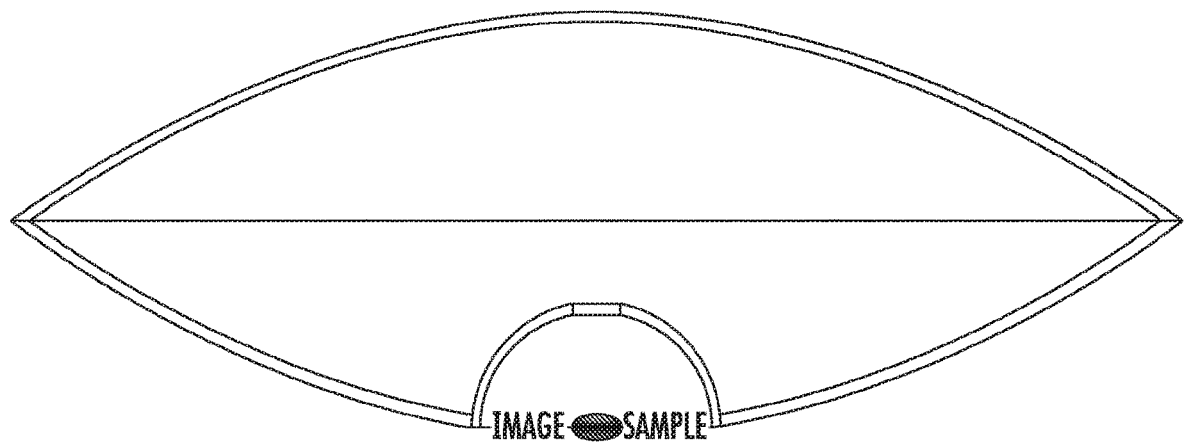
FIG. 5 is a diagram illustrating an overlapping secondary image.

Optically, the secondary image formed is upright in the lateral (XY) dimensions but inverted in the axial (Z) dimension, as denoted by the green/magenta sample and image. Thus, as the sample moves closer to the vertex plane, the image begins to overlap the sample at the vertex plane. FIG. 4 is a diagram illustrating an image overlapping the sample at the vertex plane. Accordingly, any plane of the sample that is coplanar with the lower vertex is overlapped by its own secondary image. FIG. 5 is a diagram illustrating an overlapping secondary image.

Figure 6:
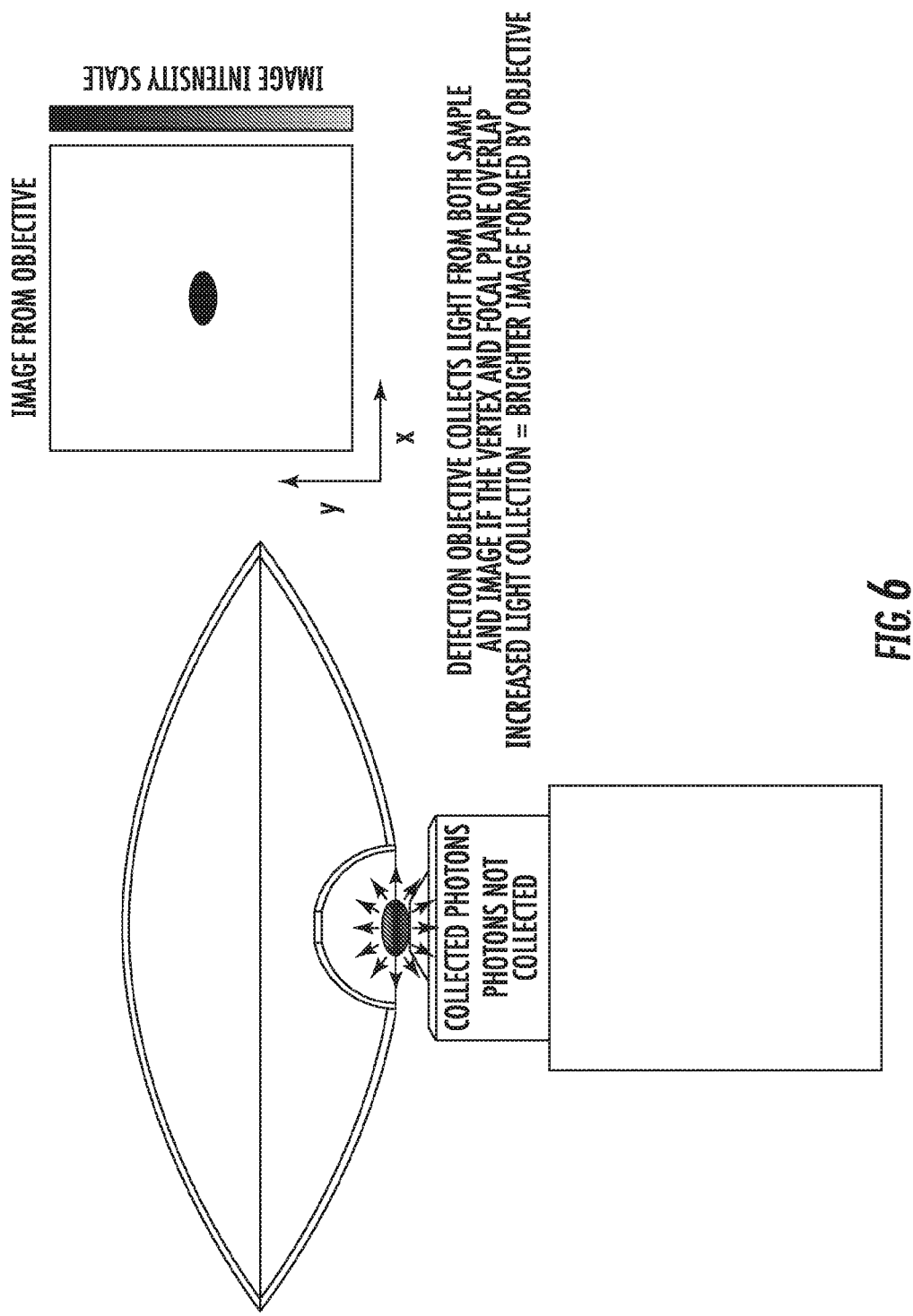
FIG. 6 is a diagram illustrating the optical setup combined with a lens-type objective element.

The significance of this optical setup, when combined with a lens-type objective element, is that photons emitted from the focal plane away from the detection objective are collected and re-focused from the same angle to the same spatial position inside the sample. FIG. 6 is a diagram illustrating the optical setup combined with a lens-type objective element. The detection objective focal plane should therefore be coplanar with the lower paraboloidal vertex to maximize in-focus signal. Since the secondary image is laterally upright, the photons carry the same spatial information as those emitted directly into the detection objective. These re-focused photons are therefore able to be collected by the detection objective. Accordingly, any image formed by the detection objective will be formed by twice the normal number of photons, effectively doubling the brightness of the image (depending on the diameter of the dome).

The refocusing nature of the dual-paraboloidal mirror system is independent of its absolute size, meaning that the mirrors can be scaled to practically any size and still function appropriately. At any size, the paraboloidal system will accept photons emitted away from the detection objective at a half angle of ~70.5°. Accordingly, the maximum half angle of the refocused light is also ~70.5°. Detection objectives with acceptance angles of less than 70.5° will not be able to collect all of the refocused light but will experience a greater relative brightness increase from their native images. Objectives with acceptance angles of greater than 70.5° can collect all of the refocused light but will experience a lesser relative brightness increase. Additionally, the relative and absolute size of the hemispherical dome should be considered. If the dome is too small, the size of the field of view over which spherical aberration (from the dome) is negligible will decrease. However, the larger the dome, the less reflective area the lower paraboloid has, meaning the larger the obscuration of the refocused light by the central dome.

Figure 7:
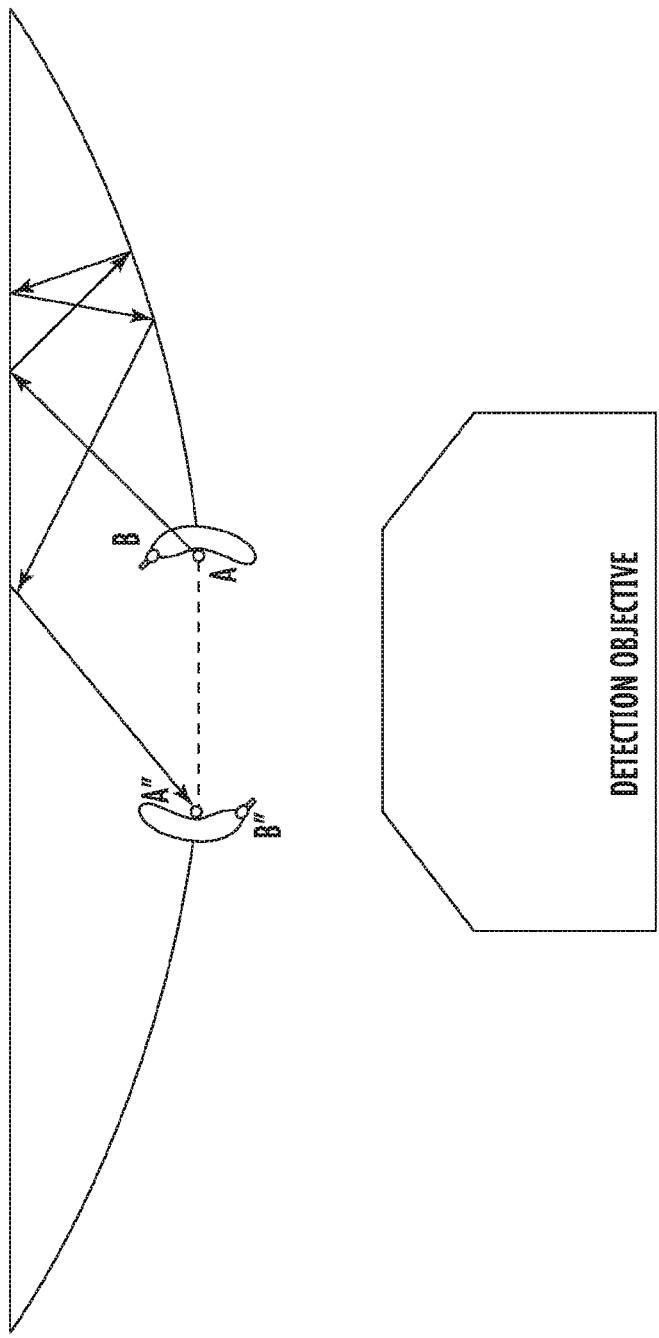
FIG. 7 illustrates an alternate modification to the dual-paraboloidal arrangement.

FIG. 7 illustrates an alternate modification to the dual-paraboloidal arrangement of MIMIC. Instead of a paraboloidal upper mirror, a planar upper mirror is substituted. The alternative system illustrated in FIG. 7 can be referred to as the MIMICp system, with a "p" for the planar upper mirror.

Figure 8:
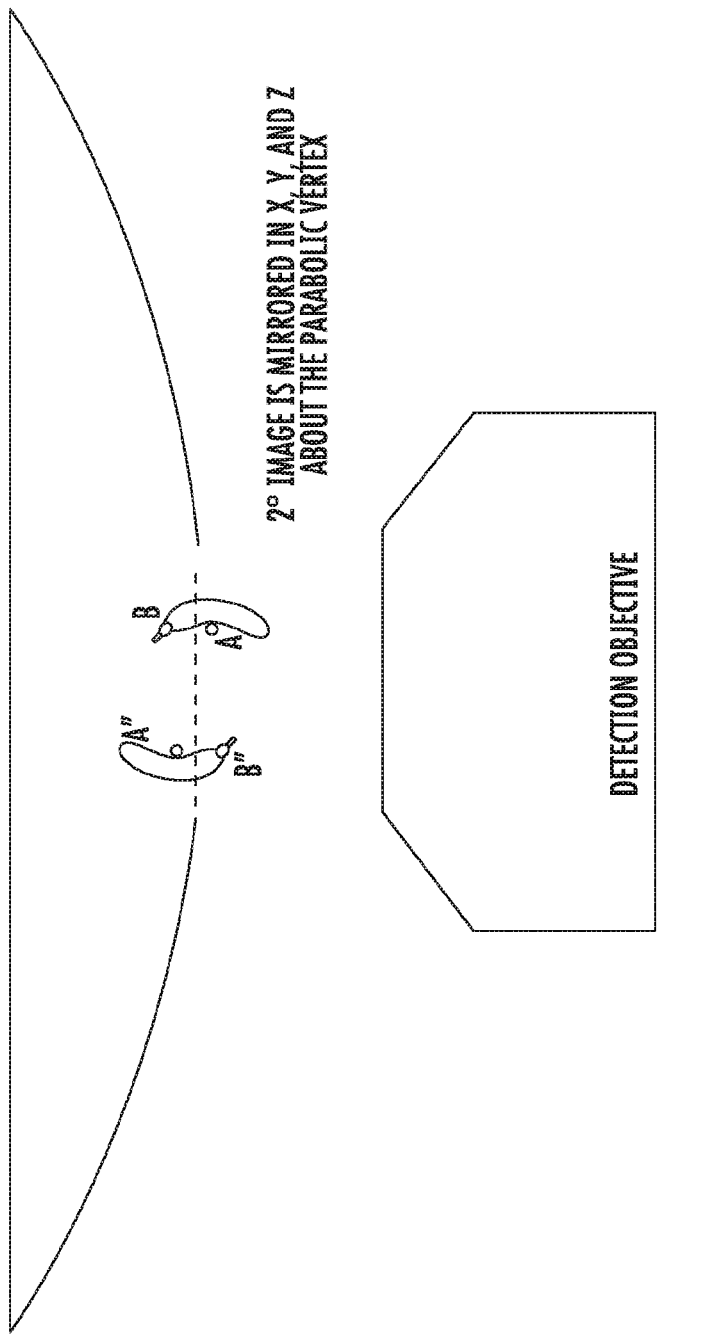
FIG. 8 illustrates that the unique geometry creates an image of the object that is inverted.
Figure 9:
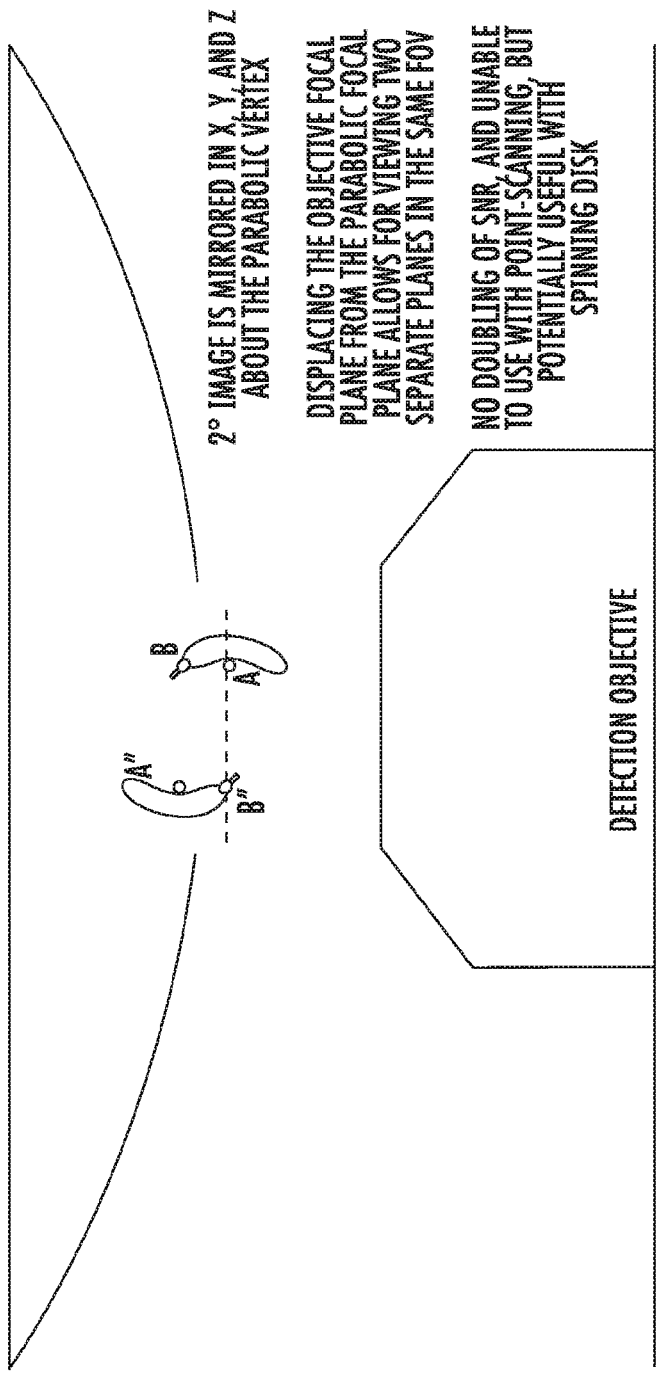
FIG. 9 illustrates a potential use of a planar mirror substitution.

FIG. 8 illustrates that the unique geometry creates an image of the object that is inverted in the X, Y, and Z dimensions about the vertex of the lower paraboloidal mirror. If the object is displaced in X and Y from the vertex, then the image will not overlap the object. FIG. 9 illustrates that this planar mirror substitution is potentially useful if the microscope user displaces the detection objective along the Z-dimension (the optical axis) relative to both the sample and to the planar/paraboloidal mirrors.

This vertical displacement will allow the objective to collect in-focus light from two separate planes of the sample simultaneously and in the same field-of-view (FOV). This orientation of mirrors will not provide the benefit of increasing the image brightness as with the dual-paraboloidal mirror orientation because the image is no longer spatially overlapping the object. However, this orientation instead allows the user to image two different planes at the normal signal-to-noise ratio (SNR), since the second image is formed from photons that would normally not be collected without the MIMIC reflective optical system.

However, this planar-paraboloidal orientation will generally only allow the user to collect information from separate focal planes if the microscope is operating with a structured detector in which all detector elements (i.e. pixels) are exposed simultaneously. For example, this mode would be compatible with CCD or CMOS cameras (commonly used for epi-illumination, TIRF, and spinning-disk confocal), but it may not be compatible with a photomultiplier tube (PMT; commonly used with single point-scanning confocal) because PMT based confocal microscopes cannot acquire multiple X/Y spatial positions of an image simultaneously.

MIMIC is compatible with most methods of fluorescence microscopy, including epi-fluorescence, scanning-point confocal, spinning-disk confocal, and total internal reflection fluorescence (TIRF). The collection benefits of MIMIC are best exploited by microscopy modes that reject (such as confocal) or eliminate (such as TIRF) out-of-focus fluorescence, as MIMIC also doubles the out-of-focus photons collected in addition to the in-focus photons.

Figure 10:
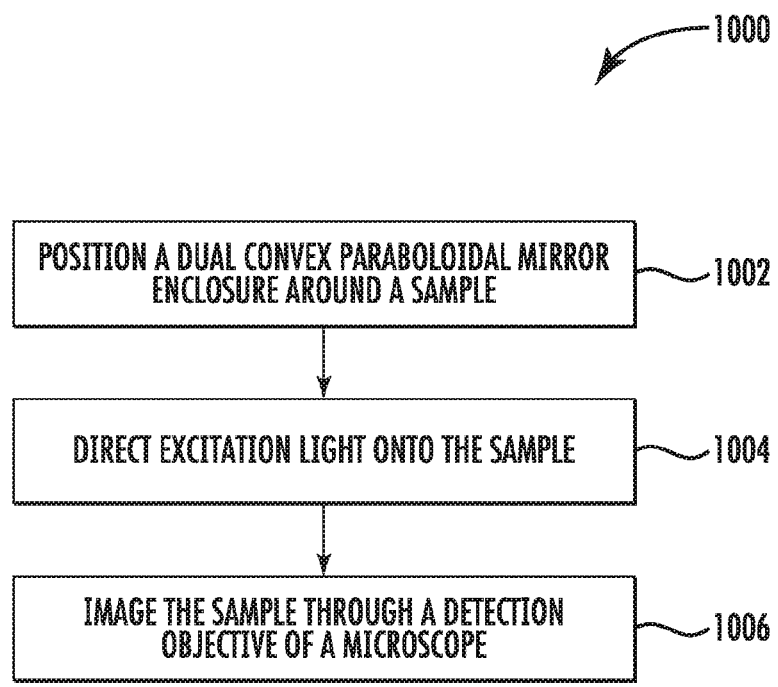
FIG. 10 is a flow diagram of an example method for imaging a sample using fluorescence microscopy.

FIG. 10 is a flow diagram of an example method 1000 for imaging a sample using fluorescence microscopy. The method 1000 includes positioning a dual convex paraboloidal mirror enclosure around the sample, e.g., the dual convex paraboloidal mirror enclosure described above with reference to FIGS. 3-6 (1002). Alternatively, the method 1000 can include positioning a planar-parabolic mirror enclosure around the sample, e.g., as described above with reference to FIGS. 7-9. The method 1000 includes directing excitation light onto the sample to form a primary image at an upper vertex of the upper paraboloidal mirror and a secondary image at a lower vertex of the lower paraboloidal mirror (1004). The method 1000 includes imaging the sample through a detection objective of a microscope (1006).

Although specific examples and features have been described above, these examples and features are not intended to limit the scope of the present disclosure, even where only a single example is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed in this specification (either explicitly or implicitly), or any generalization of features disclosed, whether or not such features or generalizations mitigate any or all of the problems described in this specification. Accordingly, new claims may be formulated during prosecution of this application (or an application claiming priority to this application) to any such combination of features. In particular, with reference to the appended claims, features from dependent claims may be combined with those of the independent claims and features from respective independent claims may be combined in any appropriate manner and not merely in the specific combinations enumerated in the appended claims.

REFERENCES

Each of the following references is hereby incorporated by reference in its entirety.
1. Hell, S. W. and Stelzer, E. H. K. 1994. Confocal microscopy with an increased detection aperture: type-B 4Pi confocal microscopy. Optics Letters. 19 (3) 222-224.

What is claimed is:

1. A method for imaging a sample using fluorescence microscopy, the method comprising:
   positioning a dual convex paraboloidal mirror enclosure around the sample, the dual convex paraboloidal mirror enclosure comprising an upper paraboloidal mirror and a lower paraboloidal mirror oriented antiparallel to each other, wherein an aperture is defined in the lower paraboloidal mirror, a hemispherical dome is mounted in the aperture, and the sample is surrounded by the hemispherical dome;
   directing excitation light onto the sample to form a primary image at an upper vertex of the upper paraboloidal mirror and a secondary image at a lower vertex of the lower paraboloidal mirror; and
   imaging the sample through a detection objective of a microscope.

2. The method of claim 1, wherein the hemispherical dome is optically clear and centered around the lower vertex of the lower paraboloidal mirror.

3. The method of claim 2, wherein the hemispherical dome is formed of glass and has a uniform thickness, wherein a dome aperture is defined in a top of the hemispherical dome, and wherein orienting the dual convex paraboloidal mirror enclosure comprises filling the dome, through the dome aperture, with a liquid media.

4. The method of claim 1, wherein positioning the dual convex paraboloidal mirror enclosure comprises positioning the sample and the dual convex paraboloidal mirror enclosure such that a plane of interest of the sample is coplanar with the lower vertex of the lower paraboloidal mirror, resulting in the plane of interest of the sample being overlapped by the secondary image.

5. The method of claim 1, wherein positioning the dual convex paraboloidal mirror enclosure comprises positioning the dual convex paraboloidal mirror enclosure such that a focal plane of the detection objective is coplanar with the lower vertex of the lower paraboloidal mirror, and wherein the secondary image is formed upright in lateral (XY) dimensions of the microscope and inverted in an axial (Z) dimension of the microscope.

6. The method of claim 1, wherein an upper focal length of the upper paraboloidal mirror is equal to a lower focal length of the lower paraboloidal mirror, wherein an upper focal point of the upper paraboloidal mirror is positioned at the lower vertex of the lower paraboloidal mirror and a lower focal point of the lower paraboloidal mirror is positioned at the upper vertex of the upper paraboloidal mirror, and wherein an upper height of the upper paraboloidal mirror is half of the upper focal length and a lower height of the lower paraboloidal mirror is half of the lower focal length.

7. The method of claim 1, wherein imaging the sample comprises imaging the sample using a microscopy mode that rejects or eliminates out-of-focus fluorescence.

8. A system for imaging a sample using fluorescence microscopy, the system comprising:
   a detection objective of a microscope and a sample mounted in view of the detection objective;
   a dual convex paraboloidal mirror enclosure positioned around the sample, the dual convex paraboloidal mirror enclosure comprising an upper paraboloidal mirror and a lower paraboloidal mirror oriented antiparallel each other, wherein an aperture is defined in the lower paraboloidal mirror, a hemispherical dome is mounted in the aperture, and the sample is surrounded by the hemispherical dome; and
   an illumination system configured for directing excitation light onto the sample to form a primary image at an upper vertex of the upper paraboloidal mirror and a secondary image at a lower vertex of the lower paraboloidal mirror and imaging the sample through the detection objective.

9. The system of claim 8, wherein the hemispherical dome is optically clear and centered around the lower vertex of the lower paraboloidal mirror.

10. The system of claim 9, wherein the hemispherical dome is formed of glass and has a uniform thickness, wherein a dome aperture is defined in a top of the hemispherical dome, and wherein orienting the dual convex paraboloidal mirror enclosure comprises filling the dome, through the dome aperture, with a liquid media.

11. The system of claim 8, wherein the dual convex paraboloidal mirror enclosure is positioned such that a plane of interest of the sample is coplanar with the lower vertex of the lower paraboloidal mirror, resulting in the plane of interest of the sample being overlapped by the secondary image.

12. The system of claim 8, wherein the dual convex paraboloidal mirror enclosure is positioned such that a focal plane of the detection objective is coplanar with the lower paraboloidal vertex, and wherein the secondary image is formed upright in lateral (XY) dimensions of the microscope and inverted in an axial (Z) dimension of the microscope.

13. The system of claim 8, wherein an upper focal length of the upper paraboloidal mirror is equal to a lower focal length of the lower paraboloidal mirror, wherein an upper focal point of the upper paraboloidal mirror is positioned at the lower vertex of the lower paraboloidal mirror and a lower focal point of the lower paraboloidal mirror is positioned at the upper vertex of the upper paraboloidal mirror, and wherein an upper height of the upper paraboloidal mirror is half of the upper focal length and a lower height of the lower paraboloidal mirror is half of the lower focal length.

14. The system of claim 8, wherein imaging the sample comprises imaging the sample using a microscopy mode that rejects or eliminates out-of-focus fluorescence.

15. An illumination system for a fluorescence microscope, the illumination system comprising:
- a dual convex paraboloidal mirror enclosure comprising an upper paraboloidal mirror and a lower paraboloidal mirror oriented antiparallel each other, wherein an aperture is defined in the lower paraboloidal mirror, and a hemispherical dome is mounted in the aperture; and
- a structure for positioning the dual convex paraboloidal mirror enclosure around a sample in view of a detection objective of a microscope such that a plane of interest of the sample is coplanar with a lower vertex of the lower paraboloidal mirror and such that a focal plane of the detection objective is coplanar with the lower vertex of the lower paraboloidal mirror.

16. The illumination system of claim 15, wherein the hemispherical dome is optically clear and centered around the lower vertex of the lower paraboloidal mirror.

17. The illumination system of claim 16, wherein the hemispherical dome is formed of glass and has a uniform thickness, wherein a dome aperture is defined in a top of the hemispherical dome, and wherein orienting the dual convex paraboloidal mirror enclosure comprises filling the dome, through the dome aperture, with a liquid media.

18. The illumination system of claim 15, wherein an upper focal length of the upper paraboloidal mirror is equal to a lower focal length of the lower paraboloidal mirror, wherein an upper focal point of the upper paraboloidal mirror is positioned at the lower vertex of the lower paraboloidal mirror and a lower focal point of the lower paraboloidal mirror is positioned at the upper vertex of the upper paraboloidal mirror, and wherein an upper height of the upper paraboloidal mirror is half of the upper focal length and a lower height of the lower paraboloidal mirror is half of the lower focal length.

19. A system for imaging a sample using fluorescence microscopy, the system comprising:
- a detection objective of a microscope and a sample mounted in view of the detection objective;
- a mirror enclosure positioned around the sample, the mirror enclosure comprising an upper planar mirror and a lower paraboloidal mirror, wherein an aperture is defined in the lower paraboloidal mirror, a hemispherical dome is mounted in the aperture, and the sample is surrounded by the hemispherical dome; and
- an illumination system configured for directing excitation light onto the sample and imaging the sample through the detection objective.

20. The system of claim 19, comprising a structure for displacing the detection objective along an optical axis of the microscope relative to both the sample and the mirror enclosure.

* * * * *